(12) United States Patent
Safir et al.

(10) Patent No.: US 11,452,967 B2
(45) Date of Patent: Sep. 27, 2022

(54) METAL-ORGANIC FRAMEWORK MATERIALS

(71) Applicants: Zymergen Inc., Emeryville, CA (US); The Regents of the University of Michigan, Ann Arbor, MI (US); THE UNITED STATES OF AMERICA AS REPRESENTED BY THE SECRETARY OF THE ARMY, Washington, DC (US)

(72) Inventors: Adam Safir, Berkeley, CA (US); Adam J. Matzger, Ann Arbor, MI (US); Shantel Leithead, Ann Arbor, MI (US); Jialiu Ma, Ann Arbor, MI (US); Gregory W. Peterson, Emeryville, CA (US); John McNamara, El Sobrante, CA (US)

(73) Assignees: Zymergen Inc., Emeryville, CA (US); The Regents of the University of Michigan, Ann Arbor, MI (US); The United States of America as Represented by the Secretary of the Army, Washington, DC (US)

(\*) Notice: Subject to any disclaimer, the term of this patent is extended or adjusted under 35 U.S.C. 154(b) by 806 days.

(21) Appl. No.: 16/038,078

(22) Filed: Jul. 17, 2018

(65) Prior Publication Data
US 2019/0046916 A1 Feb. 14, 2019

Related U.S. Application Data

(60) Provisional application No. 62/533,617, filed on Jul. 17, 2017.

(51) Int. Cl.
*B01D 53/02* (2006.01)
*B01J 20/28* (2006.01)
(Continued)

(52) U.S. Cl.
CPC ........... *B01D 53/02* (2013.01); *B01J 20/226* (2013.01); *B01J 20/28066* (2013.01); *B01J 20/3085* (2013.01); *B01D 2253/204* (2013.01)

(58) Field of Classification Search
None
See application file for complete search history.

(56) References Cited

U.S. PATENT DOCUMENTS

| 7,659,097 B2 | 2/2010 | Renninger et al. |
| 8,222,179 B2 | 7/2012 | Matzger et al. |
| (Continued) | | |

FOREIGN PATENT DOCUMENTS

| CN | 106905537 A | 6/2017 |
| DE | 102005000938 A1 | 7/2006 |
| (Continued) | | |

OTHER PUBLICATIONS

PCT International Search Report and Written Opinion dated Jan. 7, 2019 issued in PCT/US2018/042547 [P003WO].
(Continued)

*Primary Examiner* — Clinton A Brooks
(74) *Attorney, Agent, or Firm* — Emily M. Haliday; Elaine Ramesh; Weaver Austin Villeneuve & Sampson LLP

(57) ABSTRACT

The present disclosure provides novel metal-organic framework materials (MOFs) useful, for example, for gas adsorption, storage, and/or separation. Also provided are methods of making the MOFs, articles of manufacture incorporating the MOFs and methods for making these, as well as methods of using the MOFs.

11 Claims, 4 Drawing Sheets

Crystal structure of Zym-800 showing a porous crystalline material

(51) Int. Cl.
*B01J 20/22* (2006.01)
*B01J 20/30* (2006.01)

(56) References Cited

U.S. PATENT DOCUMENTS

| 8,383,545 | B2 | 2/2013 | Matzger et al. |
|---|---|---|---|
| 2004/0081611 | A1 | 4/2004 | Muller et al. |
| 2006/0252641 | A1 | 11/2006 | Yaghi et al. |
| 2008/0184881 | A1 | 8/2008 | Zhou et al. |
| 2008/0190289 | A1 | 8/2008 | Muller et al. |
| 2009/0203102 | A1 | 8/2009 | Cervin et al. |
| 2009/0282545 | A1 | 11/2009 | Eichelberger et al. |
| 2010/0003716 | A1 | 1/2010 | Cervin et al. |
| 2010/0048964 | A1 | 2/2010 | Calabria et al. |
| 2010/0076220 | A1 | 3/2010 | Schubert et al. |
| 2010/0170395 | A1 | 7/2010 | Farha et al. |
| 2010/0297749 | A1 | 11/2010 | Aravanis et al. |
| 2011/0045563 | A1 | 2/2011 | Melis |
| 2011/0137007 | A1 | 6/2011 | Suzuki et al. |
| 2014/0033920 | A1 | 2/2014 | Tate et al. |
| 2014/0068797 | A1 | 3/2014 | Doudna et al. |
| 2014/0315985 | A1 | 10/2014 | May et al. |
| 2016/0175827 | A1 | 6/2016 | Hupp et al. |

FOREIGN PATENT DOCUMENTS

| DE | 102005012087 A1 | 9/2006 |
|---|---|---|
| DE | 102005022844 A1 | 11/2006 |
| EP | 1674555 A1 | 6/2006 |
| WO | WO 2003/035717 A1 | 5/2003 |
| WO | WO 2003/064030 A1 | 8/2003 |
| WO | WO 2003/101975 A1 | 12/2003 |
| WO | WO 2003/102000 A1 | 12/2003 |
| WO | WO 2004/037895 A1 | 5/2004 |
| WO | WO 2005/003069 A2 | 1/2005 |
| WO | WO 2005/003622 A1 | 1/2005 |
| WO | WO 2005/049484 A1 | 6/2005 |
| WO | WO 2006/089908 A1 | 8/2006 |
| WO | WO 2007/053181 A2 | 5/2007 |
| WO | WO 2009/076676 A2 | 6/2009 |
| WO | WO 2009/132220 A2 | 10/2009 |
| WO | WO 2010/003007 A2 | 1/2010 |
| WO | WO 2011/034863 A1 | 3/2011 |
| WO | WO-2019036140 A1 | 2/2019 |

OTHER PUBLICATIONS

PCT International Preliminary Report on Patentability dated Jan. 21, 2020 issued in PCT/US2018/042547 [P003WO].

Bacchi A et al., (2012) "From Local Control to Collective Response: Fabrication of Responsive Organometallic Crystalline Materials by Careful Design of Functionalities and Tailoring of the Intermolecular Interactions" *Crystal Growth & Design*, 12(8): 4240-4247.

Begum MSA et al., (2010) "A metallopolymer, [Cu(abt)]∞ (abt, 2-aminobenzenethiol) with novel structural patterns resembling black phosphorus" *Inorganica Chimica Acta*, 363(10): 2144-2148.

Bucar D-K et al., (2007) "Template-Controlled Reactivity in the Organic Solid State by Principles of Coordination-Driven Self-Assembly" *European Journal of Inorganic Chemistry*, 29: 4559-4568.

Cheetham AK et al., (1999) "Open-Framework Inorganic Materials" *Angewandte Chemie International Edition*, 38(22): 3268-3292.

Cooper L et al., (2014) "ZrIV Coordination Polymers Based on a Naturally Occurring Phenolic Derivative" *European Journal of Inorganic Chemistry*, 36, 6281-6289.

DeCoste et al., (2014) "Metal-Organic Frameworks for Air Purification of Toxic Chemicals" *Chem. Rev.*, 114(11): 5695-5727.

Fernández-Palacio et al., (2014) "Functionalized aminocarboxylate moieties as linkers for coordination polymers: influence of the substituents in the dimensionality of the final structure" *CrystEngComm*, 16, 3376-3386.

Hamano Y et al., (2007) "epsilon-Poly-L: -lysine producer, Streptomyces albulus, has feedback-inhibition resistant aspartokinase" *Appl. Microbiol. Biotechnol.*, 76(4):873-882.

Lammert M et al., (2013) "Single- and Mixed-Linker Cr-MIL-101 Derivatives: A High-Throughput Investigation" *Inorganic Chemistry*, 52(15): 8521-8528.

Liu CS et al., (2017) "Metal-Organic Framework Supported on Processable Polymer Matrix by In Situ Copolymerization for Enhanced Iron(III) Detection" *Chem. Eur. J.*, 23, 3885-3890.

Parnham ER et al., (2007) "Ionothermal Synthesis of Zeolites, Metal-Organic Frameworks, and Inorganic-Organic Hybrids" *Accounts of Chemical Research*, 40 (10): 1005-1013.

Qi Q. et al., (2011) "Metabolically engineered soybean seed with enhanced threonine levels: biochemical characterization and seed-specific expression of lysine-insensitive variants of aspartate kinases from the enteric bacterium *Xenorhabdus bovienii*" *Plant Biotechnol.*, 9(2): 193-204.

Thuéry P, (2012) "Uranyl Ion Complexes with Ammoniobenzoates as Assemblers for Cucurbit[6]uril Molecules" *Crystal Growth & Design*, 12(1): 499-507.

Velasco I et al., (2005) "A new mutation in the yeast aspartate kinase induces threonine accumulation in a temperature-regulated way" *Yeast*, 22(2):99-110.

Yang J et al., (2012) "Zinc(II) Complexes with Dangling Functional Organic Groups" *European Journal of Inorganic Chemistry*, 27: 4294-4300.

Crystal structure of Zym-800 showing a porous crystalline material

ZYM-800 (8/Zn) has been shown to absorb 11 wt% $CO_2$ at both 4°C and room temperature.

- ZYM-800 absorbs $CO_2$ at room temperature, and then releases $CO_2$ upon heating.

- The MOF is recyclable, and therefore can be used for repeated separation and storage procedures.

METAL-ORGANIC FRAMEWORK MATERIALS

CROSS-REFERENCE TO RELATED APPLICATIONS

This application claims the benefit of U.S. provisional application No. 62/533,617, filed Jul. 17, 2017, which is hereby incorporated by reference in its entirety.

STATEMENT AS TO RIGHTS TO INVENTIONS MADE UNDER FEDERALLY SPONSORED RESEARCH AND DEVELOPMENT

This invention was made with Government support under Agreement No. HR0011-15-9-0014, awarded by DARPA. The Government has certain rights in the invention.

FIELD OF THE DISCLOSURE

The present invention relates generally to the area of metal-organic framework materials ("MOFs"). In particular, the invention relates to novel MOFs, and methods of making and using them (e.g., for gas adsorption).

BACKGROUND

Coordination polymers are a class of materials that are formed from extended chains, sheets or networks of metal ions interconnected by ligands. Metal organic frameworks ("MOFs") are a type of coordination polymer having extended three-dimensional framework structures. MOFs show great promise in a wide range of applications including gas storage/release. There is particular interest in porous MOFs with accessible coordinatively unsaturated metal sites since these have been shown to greatly enhance the gas storage-release profile. For example, such sites are found in the honeycomb-like structure of the CPO-27 family (or MOF-74). These frameworks are constructed from chains of edge-sharing metal-oxygen polyhedra (octahedra when hydrated, square pyramids when dehydrated) connected by 2,5-dihy-droxyterephthalate units. The large one-dimensional hexagonal channels permit easy access to the coordinatively unsaturated sites upon activation (dehydration). Indeed, such materials possess excellent adsorption/release profiles for many harmful and biologically active gasses including NO, $H_2S$ and $CO_2$. They also show useful anti-bacterial properties both in their pristine and NO-loaded forms.

SUMMARY

Various embodiments contemplated herein may include, but need not be limited to, one or more of the following:

Embodiment 1: A metal-organic framework material (MOF) including: at least one metal; and at least one ligand derived from a molecule including the structure $Ar(R_1HR')(R_2H)(R_3)$, wherein: Ar includes an aromatic ring or multi-ring structure; $R_1$ is an element bonded to Ar, hydrogen (H), and R'; R' is selected from the group consisting of H, $CH_3$, and $C_2H_5$; $R_2$ is different from $R_1$ and is an element bonded to Ar and hydrogen (H); $R_1HR'$ and $R_2H$ are ortho to each other; and $R_3$ is bonded to Ar and includes a structure that coordinates with the at least one metal.

Embodiment 2: The MOF of embodiment 1, wherein $R_3$ is meta to $R_1$ and para to $R_2$.

Embodiment 3: The MOF of embodiment 1, wherein $R_3$ is para to $R_1$ and meta to $R_2$.

Embodiment 4: The MOF of any one of embodiments 1-3, wherein $R_1$ is selected from the group consisting of nitrogen (N), phosphorus (P), arsenic (As), antimony (Sb), and bismuth (Bi).

Embodiment 5: The MOF of any one of embodiments 1-4, wherein $R_2$ is selected from the group consisting of oxygen (O), sulfur (S), selenium (Se), tellurium (Te), and polonium (Po).

Embodiment 6: The MOF of embodiment 5, wherein $R_2$ is O or S.

Embodiment 7: The MOF of embodiment 6, wherein $R_2$ is O.

Embodiment 8: The MOF of any one of embodiments 1-7, wherein $R_3$ is selected from the group consisting of an $Ar(R_1HR')(R_2H)$ moiety, $C(=O)OH$, OH, SH, $NH_2$, NHR', and a heterocyclic ring.

Embodiment 9: The MOF of embodiment 8, wherein $R_3$ is $C(=O)OH$.

Embodiment 10: The MOF of any one of embodiments 1-9, wherein the metal is selected from the group consisting of zinc (Zn), cadmium (Cd), nickel (Ni), manganese (Mn), magnesium (Mg), copper (Cu), cobalt (Co), iron (Fe), and calcium (Ca).

Embodiment 11: The MOF of embodiment 10, wherein the metal is Zn or cadmium Co.

Embodiment 12: The MOF of embodiment 11, wherein the metal is Zn.

Embodiment 13: A metal-organic framework material (MOF) including: zinc (Zn); and at least one ligand derived from a molecule including the structure $Ar(R_1HR')(R_2H)$, wherein: Ar includes an aromatic ring or multi-ring structure; $R_1$ is an element bonded to Ar, hydrogen (H), and R' and is selected from the group consisting of nitrogen (N), phosphorus (P), arsenic (As), antimony (Sb), and bismuth (Bi); R' is selected from the group consisting of H, $CH_3$, and $C_2H_5$; $R_2$ is different from $R_1$ and is an element bonded to Ar and hydrogen (H).

Embodiment 14: The MOF of embodiment 13, wherein $R_2$ is selected from the group consisting of oxygen (O), sulfur (S), selenium (Se), tellurium (Te), and polonium (Po).

Embodiment 15: The MOF of embodiment 14, wherein $R_2$ is O or S.

Embodiment 16: The MOF of embodiment 15, wherein $R_2$ is O.

Embodiment 17: The MOF of any one of embodiments 1-16, wherein $R_1$ is N or P.

Embodiment 18: The MOF of embodiment 17, wherein $R_1$ is N.

Embodiment 19: The MOF of any one of embodiments 1-18, wherein R' is H.

Embodiment 20: The MOF of any one of embodiments 1-19, wherein Ar is a non-benzene aromatic ring.

Embodiment 21: A metal-organic framework material (MOF) including: at least one metal; and at least one ligand, wherein the at least one ligand is derived from 3-amino-4-hydroxybenzoic acid.

Embodiment 22: The MOF of embodiment 21, wherein the at least one metal is selected from the group consisting of zinc (Zn), cadmium (Cd), nickel (Ni), manganese (Mn), magnesium (Mg), copper (Cu), cobalt (Co), iron (Fe), and calcium (Ca).

Embodiment 23: The MOF of embodiment 22, wherein the at least one metal is Zn or Co.

Embodiment 24: The MOF of embodiment 23, wherein the at least one metal is Zn.

Embodiment 25: The MOF of any one of embodiments 1-24, wherein the volume of the MOF increases by more than 10% after adsorption of a substance by the MOF, as compared to the volume of the MOF after activation, but prior to adsorption.

Embodiment 26: The MOF of embodiment 25, wherein the substance includes a gas.

Embodiment 27: A method of producing a MOF according to any one of embodiments 1-26, the method including combining: the metal or a salt thereof; the molecule; and at least one solvent, to form a mixture.

Embodiment 28: The method of embodiment 27, wherein the method additionally includes heating the mixture.

Embodiment 29: The method of embodiment 27 or embodiment 28, wherein the solvent includes an organic solvent.

Embodiment 30: The method of any one of embodiments 27-29, wherein the molecule is chemically synthesized.

Embodiment 31: The method of any one of embodiments 27-29, wherein the molecule is obtained from a microbe engineered to produce the molecule.

Embodiment 32: The method of embodiment 31, wherein the microbe is a bacterium or fungus.

Embodiment 33: The method of embodiment 32, wherein the microbe is a bacterium.

Embodiment 34: The method of embodiment 33, wherein the bacterium is of the genus *Corynebacteria*.

Embodiment 35: The method of embodiment 34, wherein the bacterium is of the species *glutamicum*.

Embodiment 36: The method of any one of embodiments 27-35, wherein: the metal salt is zinc nitrate hexahydrate ($Zn(NO_3)_2$); the ligand includes 3-amino-4-hydroxybenzoic acid; the solvent includes diethylformamide (DEF); and the method includes heating the mixture to a temperature of greater than 95° C. for at least 12 hours to produce a MOF in a solution.

Embodiment 37: The method of embodiment 36, wherein the method additionally includes: allowing the mixture to cool to room temperature; decanting the solution; and washing the MOF in an alcohol.

Embodiment 38: The method of embodiment 37, wherein the method additionally includes activating the MOF.

Embodiment 39: The method of embodiment 38, wherein the MOF is activated by heating the MOF to a temperature of greater than 200° C. under vacuum for at least 12 hours to produce an activated MOF.

Embodiment 40: A MOF produced by the method of any one of embodiments 27-39.

Embodiment 41: The MOF of embodiment 40, wherein the volume of the MOF increases by more than 10% adsorption of a substance by the MOF, as compared to the volume of the MOF after activation, but prior to adsorption.

Embodiment 42: The MOF of embodiment 40, wherein the substance includes a gas.

Embodiment 43: An article of manufacture including a MOF according to any one of embodiments 1-26 and 40-42.

Embodiment 44: The article of manufacture of embodiment 43, wherein the article of manufacture is selected from the group consisting of a mask, a suit, a filter, and a personal enclosure.

Embodiment 45: A method of making an article of manufacture according to embodiment 44, wherein the method includes incorporating a MOF according to any one of embodiments 1-26 and 40-42 into an article of manufacture selected from the group consisting of a mask, a suit, a filter, and a personal enclosure.

Embodiment 46: A method of adsorbing at least one substance, wherein the method includes contacting a MOF according to any one of embodiments 1-26 and 40-42 with the at least one substance, wherein the MOF has been activated prior to contact with the at least one substance.

Embodiment 47: The method of embodiment 46, wherein the MOF has been heated to a temperature of greater than 200° C. under vacuum for at least 18 hours to activate the MOF.

Embodiment 48: The method of embodiment 46 or embodiment 47, wherein the at least one substance includes a gas.

Embodiment 49: The method of embodiment 48, wherein the gas is selected from the group consisting of hydrogen, nitrogen, carbon monoxide, carbon dioxide, oxygen, chlorine, ammonia, cyanogen chloride, hydrogen sulfide, hydrogen cyanide, and sulfur dioxide.

Embodiment 50: The method of any one of embodiments 46-49, wherein the MOF is contacted with a mixture of gases and the method includes separating a gas from the mixture of gases.

Embodiment 51: A method of chemically modifying at least one substance, wherein the method comprises contacting a MOF according to any one of embodiments 1-26 and 40-42 with the at least one substance.

Embodiment 52: The method of claim 51, wherein the at least one substance comprises a toxin.

DETAILED DESCRIPTION

Figure 1:
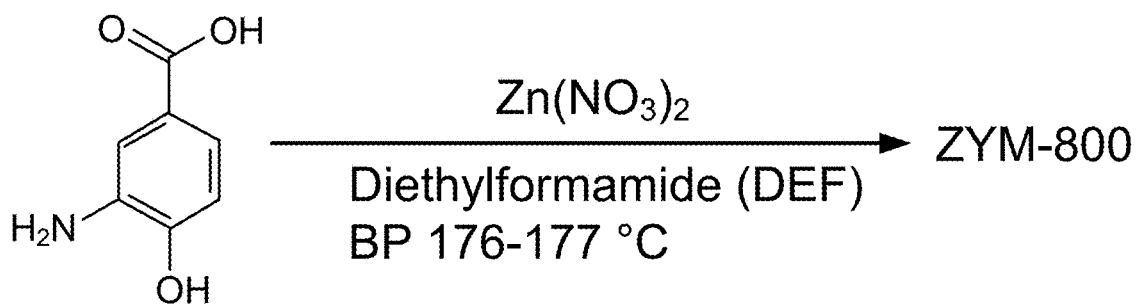
FIG. 1: A scheme for producing a MOF from zinc nitrate hexahydrate and 3-amino-4-hydroxybenzoic acid, as described in Example 1, and an illustration of the resulting crystal structure.
Figure 1:
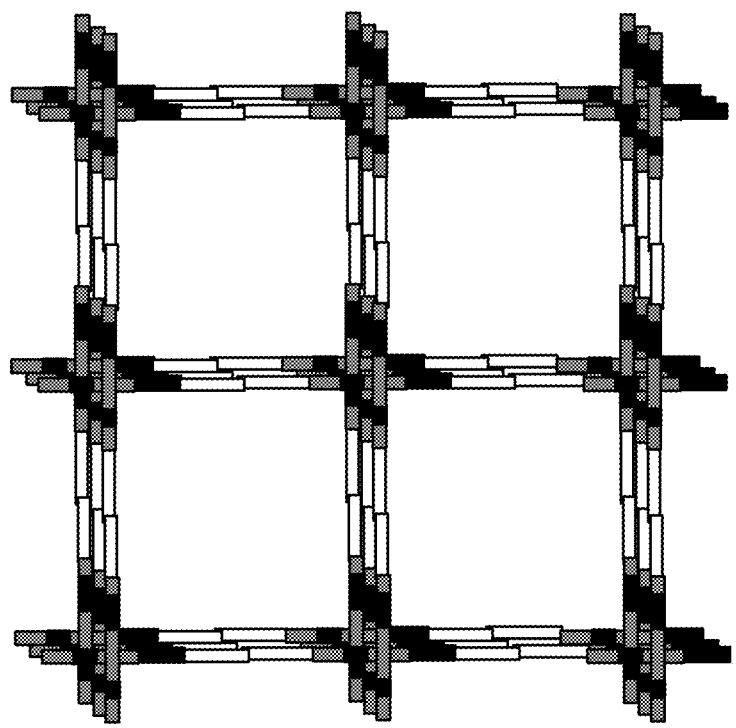

The present disclosure provides novel metal-organic framework materials (MOFs) useful, for example for gas adsorption, storage, and/or separation.

Definitions

Terms used in the claims and specification are defined as set forth below unless otherwise specified.

A "metal-organic framework material" ("MOF") is a compound in which metal ions or clusters coordinate to organic ligands to form a coordination compound with repeating coordination entities extending in one, two, or three dimensions (also termed a "coordination polymer").

As used herein, the term "derived from" is used with reference to a ligand to describe a molecule that is present in partly deprotonated or completely deprotonated form.

As used herein, the term "solvent" encompasses pure solvents as well as mixtures of different solvents.

The term "vacuum" is used herein to refer to any sub-atmospheric pressure (i.e., at sea level, any pressure less than 1013.25 millibar).

A MOF is "activated" by any processing step that increases the adsorption capacity of the MOF generally or for a particular substance. In some embodiments, activation increases the capacity of the MOF for gas (general or specific) adsorption.

The term "fermentation" is used herein to refer to a process whereby a microbial cell converts one or more substrate(s) into a desired product by means of one or more biological conversion steps, without the need for any chemical conversion step.

The term "engineered" is used herein, with reference to a cell, to indicate that the cell contains at least one genetic alteration introduced by man that distinguishes the engineered cell from the naturally occurring cell.

The term "endogenous" is used herein to refer to a cellular component, such as a polynucleotide or polypeptide, that is naturally present in a particular cell.

The term "heterologous" is used herein, with reference to a polynucleotide or polypeptide introduced into a host cell, to refer to a polynucleotide or polypeptide, respectively, derived from a different organism, species, or strain than that of the host cell. A heterologous polynucleotide or polypeptide has a sequence that is different from any sequence(s) found in the same host cell.

As used with reference to polypeptides, the term "wild-type" refers to any polypeptide having an amino acid sequence present in a polypeptide from a naturally occurring organism, regardless of the source of the molecule; i.e., the term "wild-type" refers to sequence characteristics, regardless of whether the molecule is purified from a natural source; expressed recombinantly, followed by purification; or synthesized. The term wild-type is also used to denote naturally occurring cells.

Enzymes are identified herein by the reactions they catalyze and, unless otherwise indicated, refer to any polypeptide capable of catalyzing the identified reaction. Unless otherwise indicated, enzymes may be derived from any organism and may have a naturally occurring or mutated amino acid sequence. As is well known, enzymes may have multiple functions and/or multiple names, sometimes depending on the source organism from which they derive. The enzyme names used herein encompass orthologs, including enzymes that may have one or more additional functions or a different name.

The term "feedback-disregulated" is used herein with reference to an enzyme that is normally negatively regulated by a downstream product of the enzymatic pathway (i.e., feedback-inhibition) in a particular cell. In this context, a "feedback-disregulated" enzyme is a form of the enzyme that is less sensitive to feedback-inhibition than the wild-type enzyme endogenous to the cell. A feedback-disregulated enzyme may be produced by introducing one or more mutations into a wild-type enzyme. Alternatively, a feedback-disregulated enzyme may simply be a heterologous, wild-type enzyme that, when introduced into a particular microbial cell, is not as sensitive to feedback-inhibition as the endogenous, wild-type enzyme. In some embodiments, the feedback-disregulated enzyme shows no feedback-inhibition in the microbial cell.

The term "sequence identity," in the context of two or more amino acid or nucleotide sequences, refers to two or more sequences that are the same or have a specified percentage of amino acid residues or nucleotides that are the same, when compared and aligned for maximum correspondence, as measured using a sequence comparison algorithm or by visual inspection.

For sequence comparison to determine percent nucleotide or amino acid sequence identity, typically one sequence acts as a "reference sequence," to which a "test" sequence is compared. When using a sequence comparison algorithm, test and reference sequences are input into a computer, subsequence coordinates are designated, if necessary, and sequence algorithm program parameters are designated. The sequence comparison algorithm then calculates the percent sequence identity for the test sequence relative to the reference sequence, based on the designated program parameters. Alignment of sequences for comparison can be conducted using BLAST set to default parameters.

The term "titer," as used herein, refers to the mass of a product (e.g., the molecule that microbial cells have been engineered to produce) produced by a culture of microbial cells divided by the culture volume.

As used herein with respect to recovering a molecule of interest from a cell culture, "recovering" refers to separating the molecule from at least one other component of the cell culture medium.

The terms "gas" and "liquid" are used herein to refer to individual gases and liquids; however, in the interest of simplicity, these terms are also used to refer to gas mixtures and liquid mixtures or liquid solutions.

The term "substance" is used herein to refer to individual substances; however, in the interest of simplicity, this terms is also used to refer to mixtures of sub stance.

Metal-Organic Framework Materials (MOFs)

Disclosed herein is a metal-organic framework material (MOF) including at least one metal and at least one ligand derived from a molecule, typically by deprotonation. In some embodiments, the molecule includes or consists of the structure $Ar(R_1HR')(R_2H)(R_3)$, wherein:

Ar includes an aromatic ring or multi-ring structure;

$R_1$ is an element bonded to Ar, hydrogen (H), and R';

R' is selected from the group consisting of H, $CH_3$, and $C_2H_5$;

$R_2$ is different from $R_1$ and is an element bonded to Ar and hydrogen (H);

$R_1HR'$ and $R_2H$ are ortho to each other; and $R_3$ is bonded to Ar and includes a structure that coordinates with the at least one metal.

Suitable metals for forming the MOF include, but are not limited to, zinc, cadmium, nickel, manganese, magnesium, copper, cobalt, iron, calcium, and combinations thereof. Example 1 below illustrates the preparation of a zinc-based MOF.

In some embodiments, Ar is an aromatic ring structure having 6 to 14 ring atoms which can be carbon or nitrogen. In certain embodiments, the ring does not have any heteroatoms. In particular embodiments, Ar is a non-benzene aromatic ring.

In various embodiments, $R_3$ can meta to $R_1$ and para to $R_2$ or $R_3$ can be para to $R_1$ and meta to $R_2$.

$R_1$ can, in some embodiments, be nitrogen, phosphorus, arsenic, antimony, and bismuth.

In some embodiments, R' is hydrogen.

$R_2$ can, in some embodiments, be oxygen, sulfur, selenium, tellurium, or polonium.

$R_3$ can, in some embodiments, be an $Ar(R_1HR')(R_2H)$ moiety, C(=O)OH, OH, SH, $NH_2$, NHR', or a heterocyclic ring.

In illustrative embodiments, $R_1$ is either nitrogen or phosphorus, and $R_2$ is either oxygen or sulfur. For example, $R_1$ can be nitrogen and $R_2$ can be oxygen, as in 3-amino-4-hydroxybenzoic acid, which served as the ligand in Example 1. In such embodiments, $R_3$ can, for example, be C(=O)OH. In variations of these embodiments, the metal either cobalt or zinc, as illustrated in Example 1. In other examples, $R_1$ can be nitrogen and $R_2$ can be sulfur, as in 3-amino-4-thiobenzoic acid and 4-amino-3-thiobenzolic acid; or $R_1$ can be phosphorus and $R_2$ can be oxygen, such as in 2,5-bis(phosphino)-1,4-benzenediol and 3-phosphino-4-hydroxybenzoic acid. Examples where $R_3$ is an $Ar(R_1HR')(R_2H)$ moiety, include 2,5-diaminohydroquinone, 3-amino-4-hydroxyphenysulfone, 4,4-diamino(1,1-diphenyl)-3,3-diol, bis (3-amino-4-hydroxyphenyl)methanone, and 2,2-bis(3-amino-4-hydroxyphenyl)hexafluoropropane.

The MOFs described herein contain pores, in particular micropores and/or mesopores. Micropores are defined as pores having a diameter of 2 nm or less, and mesopores are defined by a diameter in the range from 2 nm to 50 nm (Pure & Appl. Chem. 57 (1985) 603-619). The presence of micropores and/or mesopores can be checked by means of sorption measurements which determine the uptake capacity of the metal organic frameworks for nitrogen at 77 kelvin (Langmuir or BET method) in accordance with DIN 66131 and/or DIN 66134.

The specific surface area, calculated according to the BET model (DIN 66131, 66134), of MOFs described herein, in powder form, can be, in various illustrative embodiments, at least 250 $m^2/g$, at least 300 $m^2/g$, at least 400 $m^2/g$, at least 500 $m^2/g$, at least 600 $m^2/g$, at least 700 $m^2/g$, or at least 800 $m^2/g$. In some embodiments, the specific surface area is less than 1000 $m^2/g$. In some embodiments, the specific surface area falls within a range bounded by any of these values (e.g., 250-800 $m^2/g$, 300-700 $m^2/g$, or 400-600 $m^2/g$).

In some embodiments, MOF described herein are characterized in that the volume of the MOF increases by more than 10% after adsorption of a substance, such as a gas, by the MOF, as compared to the volume of the MOF after activation, but prior to adsorption.

MOFs described herein can have a powdered or agglomerated form.

Methods of Producing MOFs

The MOFs described herein can be obtained by reaction of a reaction mixture including at least one metal or metal salt and a molecule including the structure $Ar(R_1HR')(R_2H)(R_3)$ (both as described above). In some embodiments, the reaction is carried out in an organic solvent at a predetermined temperature and a predetermined pressure.

In some embodiments, the molecule can be present as completely or partly deprotonated anion (i.e., the ligand) and can have any suitable cation. Suitable cations include, for example, monovalent or divalent, preferably monovalent, metal ions. Examples are, in particular, sodium and potassium salts. In some embodiments, cations of ammonium compounds can be used, e.g., ammonium itself or alkylammonium cations.

MOFs can be produced by hydrothermal or solvothermal techniques, where crystals are slowly grown from a hot solution. MOFs are typically constructed from bridging organic ligands that remain intact throughout the synthesis. See, e.g., Cheetham, A K et al. (1999) "Open-framework inorganic materials," Angewandte Chemie International Edition. 38 (22): 3268-3292 (which is incorporated by reference herein for its description of MOF production); Bucar, D-K et al. (2007) "Template-controlled reactivity in the organic solid state by principles of coordination-driven self-assembly," European Journal of Inorganic Chemistry (29): 4559-4568 (which is incorporated by reference herein for its description of MOF production); Parnham, E R et al. (2007) "Ionothermal Synthesis of Zeolites, Metal-Organic Frameworks, and Inorganic-Organic Hybrids," Accounts of Chemical Research. 40 (10): 1005-1013 (which is incorporated by reference herein for its description of MOF production). A templating approach that is useful for MOFs intended for gas storage is the use of metal-binding solvents such as N,N-diethylformamide and water. In these cases, metal sites are exposed when the solvent is evacuated, allowing hydrogen to bind at these sites.

In such techniques, the metal is typically provided as a metal salt. The metal salt can be in the form of a nitrate, an alkoxide, a carboxylate, an acetonate, a halide, a sulfate a salt of an organic or inorganic, oxygen-comprising acid, or a mixture thereof.

Suitable alkoxides include, for example, a methoxide, ethoxide, n-propoxide, i-propoxide, n-butoxide, i-butoxide, t-butoxide, and phenoxide.

Suitable carboxylates include, for example, a mono-carboxylic acid, a dicarboxylic acid, and an ortho-hydroxy acid.

A suitable acetonate is, for example, acetylacetonate.

Suitable halides include, for example, chloride, bromide, and iodide.

Suitable organic, oxygen-comprising acids include, for example, formic acid, acetic acid, propionic acid or another alkylmonocarboxylic or a arylmonocaboxylic acid such as benzoic acid.

Suitable inorganic, oxygen-comprising acids include, for example, sulfuric acid, sulfurous acid, phosphoric acid, and nitric acid.

The metal salt can, if appropriate, include water of hydration. For example, the metal salt can be a hydrate of chloride, nitrate, or sulfate.

In solvothermal production, the reaction for producing MOFs is carried out in the presence of an organic solvent. The organic solvent can be a $C_{1-6}$-alkanol, dimethyl sulfoxide (DMSO), N,N-dimethylformamide (DMF), N,N-diethylformamide (DEF), N,N-dimethylacetamide (DMAc), acetonitrile, toluene, dioxane, benzene, chlorobenzene, methyl ethyl ketone (MEK), pyridine, tetrahydrofuran (THF), ethyl acetate, optionally halogenated $C_{1-200}$-alkane, sulfolane, glycol, N-methylpyrrolidone (NMP), gamma-butyrolactone, an alicyclic alcohols (such as cyclohexanol), a ketone (such as acetone or acetylacetone), a cycloketone (such as cyclohexanone), sulfolene, or a mixture thereof.

A $C_{1-6}$-alkanol is an alcohol having from 1 to 6 carbon atoms. Examples include methanol, ethanol, n-propanol, i-propanol, n-butanol, i-butanol, t-butanol, pentanol, hexanol, and a mixture thereof.

An optionally halogenated $C_{1-200}$-alkane is an alkane that has from 1 to 200 carbon atoms, and in which one or more, up to all, hydrogen atoms can be replaced by halogen, such as chlorine or fluorine. Examples include chloroform, dichloromethane, tetrachloromethane, dichloroethane, hexane, heptane, octane and a mixture thereof.

The reaction is typically carried out under nonaqueous conditions. Here, "nonaqueous" refers to a reaction mixture that has a maximum water content of 10% by weight. In various embodiments, the reaction mixture has a maximum water content of 5% by weight, 1% by weight, 0.1% by weight, 0.01% by weight, based on the total weight of the solvent.

In solvothermal production, the term "thermal" refers to a process in which the reaction to form the MOF is carried out in a pressure vessel which is closed during the reaction and is heated to an elevated temperature so that a pressure is built up within the reaction medium in the pressure vessel as a result of the vapor pressure of the solvent present.

The reaction is typically heated, for example, to a temperature of greater than 95° C. In various embodiments, the reaction is heated to a temperature of at least: 100° C., 110° C., 120° C., 130° C., 140° C., 150° C., 160° C., 170° C. or more. The temperature can fall within a range bounded by any of these values, for example, temperature ranges from 100° C. to 200° C., from 110° C. to 170° C., or from 120° C. to 150° C.

In some embodiments, the reaction is carried out at a pressure of less than 16 bar (absolute), particularly less than 3 bar (absolute), more particularly not more than 1230 mbar (absolute). In some embodiments, the reaction takes place at atmospheric pressure or below (i.e., under vacuum).

In some embodiments, the reaction mixture is stirred, which is particularly advantageous when carrying out large-scale reactions.

The reaction is typically carried out for a time sufficient to produce a MOF. This time can vary depending on the reaction conditions. In various embodiments, the reaction time is at least: 12 hours, 13 hours, 14 hours, 15 hours, 16 hours, 17 hours, 18 hours, 19 hours, 20 hours, 21 hours, 22 hours, 23 hours, or 24 hours, or more. The reaction time can fall into any range bounded by any of these values (e.g., 14-18 hour). In many embodiments, the reaction can simply be allowed to proceed overnight.

In some embodiments, the MOF can be "washed" with a nonaqueous solvent. Here, the ligand is removed in a type of extraction process and, if appropriate, replaced by a solvent molecule in the framework. Washing typically entails decanting the solution component of the reaction mixture and replacing it with a nonaqueous solvent. The solvent can optionally be decanted and replaced multiple times, e.g., two, three, four, or five times.

The total treatment (with one or more cycles of decanting and replacement) is typically carried out for at least 30 minutes and up to 7 days. In various embodiments, the treatment time is at least: 1 hour, 2 hours, 3 hours, 4 hours, 5 hours, 6 hours, 7 hours, 8 hours, 9 hours, 10 hours, 12 hours, 14 hours, 16 hours, 18 hours, 20 hours, or 22 hours or at least 2 days, 3 days, 4 days, 5 days, or 6 days. The treatment time can fall within a range bounded by any of these periods (e.g., 6 to 8 hours).

The MOF can be treated with a nonaqueous solvent at room temperature or an elevated temperature. In various embodiments, the treatment temperature is at least 40° C. or at least 60° C. In particular embodiments the treatment is carried out at the boiling point of the nonaqueous solvent used (under reflux).

The treatment can be carried out in a simple vessel by slurrying and stirring the MOF. It is also possible to use extraction apparatuses, such as Soxhlet apparatuses. For industrial production, industrial extraction apparatuses can be used.

Suitable nonaqueous solvents for this treatment step include, but are not limited to, the organic solvents discussed above for use in the reaction. For example, methanol, ethanol, propanol, acetone, MEK, formamide solvents (e.g., DMF, DEF, NMP), or mixtures thereof can be used for this treatment step. The solvent used for this step can be identical to or different from that used for the reaction to produce the MOF. Generally, the solvent is substantially water-free, though this is not required.

In some embodiments, washing is followed by a heated evacuation step, which activates the MOF. In various embodiments, this step is performed at a temperature of at least: 125° C., 150° C., 175° C., 200° C., 225° C., 250° C., 275° C., or more. In various embodiments, the treatment time is at least: 4 hours, 8 hours, 12 hours, 16 hours, 20 hours, 24 hours, 28 hours, 32 hours, 36 hours, or more. In various embodiments, the evacuation is carried out by flowing gas through the MOF at ambient pressure, using a conventional vacuum pump (e.g., at a vacuum pressure of at least: 5 mTorr, 10 mTorr, 25 mTorr, 50 mTorr, or 100 mTorr), or under diffusion pump (e.g., at a vacuum pressure of at least 1 mTorr).

Example 1 shows the production of MOF formed from zinc nitrate hexahydrate and 3-amino-4-hydroxybenzoic acid, using DEF as the solvent for the reaction and methanol washing to remove excess ligand from the pores.

Fermentative Production of Molecules for Use in Producing MOFs

The molecule from which the ligand is derived can be purchased (e.g., 3-amino-4-hydroxybenzoic acid, used in Example 1, is commercially available) or produced by chemical synthesis or by culturing a microbe capable of producing the molecule.

Engineering for Microbial Production

In some embodiments, the microbe is one that has been engineered to produce the molecule. For example, if the microbe does not naturally produce the molecule, but produces a precursor, one or more enzymes necessary to produce the molecule can be introduced into the microbe using standard genetic engineering techniques. A microbe that produces the molecule of interest (either naturally or via genetic engineering) can be engineered to enhance production of the molecule. In some embodiments, this is achieved by increasing the activity of one or more of the enzymes in the pathway that leads to the molecule of interest. In certain embodiments, the activity of one or more upstream pathway enzymes is increased by modulating the expression or activity of the endogenous enzyme(s). Alternatively or additionally, the activity of one or more upstream pathway enzymes can be supplemented by introducing one or more of the corresponding genes into the microbial host cell. For example, the microbe can be engineered to express multiple copies of one or more of the pathway enzymes, and/or one or more pathway enzymes can be expressed from introduced genes linked to particularly strong (constitutive or inducible) promoters. An introduced pathway gene may be heterologous or may simply be an additional copy of an endogenous gene. Where a heterologous gene is used, it may be codon-optimized for expression in the particular host microbe employed.

3-amino-4-hydroxybenzoic acid can be produced from L-aspartate-4-semialdehyde and/or glycerone-3-phosphate (G3P), both native metabolites produced by many microbes. Microbial cells engineered to express a 2-amino-4,5-dihydroxy-6-oxo-7-phosphooxy-hepanoate synthase and a 3-amino-4-hydroxybenzoate synthase can covert these native metabolites to 3-amino-4-hydroxybenzoic acid. G3P is part of central metabolism/glycolysis and has a high flux without major feedback regulation. L-aspartate-4-semialdehyde is derived from the precursor L-aspartate. The first step of the pathway from L-aspartate to L-aspartate semialdehyde is mediated by aspartate kinase, which is known to be feedback regulated. Feedback-disregulated versions of this enzymes are known and can be used to engineer microbial cells with enhanced production of L-aspartate semialdehyde, as a means of increasing 3-amino-4-hydroxybenzoic acid production. See, e.g., Valasco, I. et al. (2005) Yeast 22 (2):99-110 (which is incorporated by reference herein for its description of feedback-disregulated aspartate kinase); Hamano, Y. et al. (2007) Appl. Microbiol. Biotechnol. 76 (4):873-82 (which is incorporated by reference herein for its description of feedback-disregulated aspartate kinase); and Qi, Q. et al. (2011) Plant Biotechnol. 9 (2):193-204 (which is incorporated by reference herein for its description of feedback-disregulated aspartate kinase).

Microbial Host Cells

Any microbe that can be used to express introduced genes can be engineered for fermentative production of molecules as described above. In certain embodiments, the microbe is one that is naturally incapable fermentative production of the molecule of interest. In some embodiments, the microbe is one that is readily cultured, such as, for example, a microbe known to be useful as a host cell in fermentative production of molecules of interest. Bacteria cells, including gram positive or gram negative bacteria can be engineered as described above. Examples include *C. glutamicum, B. subtilis, B. licheniformis, B. lentus, B. brevis, B. stearothermophilus, B. alkalophilus, B. amyloliquefaciens, B. clausii, B. halodurans, B. megaterium, B. coagulans, B. circulans, B. lautus, B. thuringiensis, S. albus, S. lividans, S. coelicolor, S. griseus, P. citrea, Pseudomonas* sp., *P. alcaligenes, Lactobacilis* spp. (such as *L. lactis, L. plantarum*), *L. grayi, E. coli, E. faecium, E. gallinarum, E. casseliflavus,* and/or *E. faecalis* cells.

There are numerous types of anaerobic cells that can be used as microbial host cells in the methods described herein. In some embodiments, the microbial cells are obligate anaerobic cells. Obligate anaerobes typically do not grow well, if at all, in conditions where oxygen is present. It is to be understood that a small amount of oxygen may be present, that is, there is some level of tolerance level that obligate anaerobes have for a low level of oxygen. Obligate anaerobes engineered as described above can be grown under substantially oxygen-free conditions, wherein the amount of oxygen present is not harmful to the growth, maintenance, and/or fermentation of the anaerobes.

Alternatively, the microbial host cells used in the methods described herein can be facultative anaerobic cells. Facultative anaerobes can generate cellular ATP by aerobic respiration (e.g., utilization of the TCA cycle) if oxygen is present. However, facultative anaerobes can also grow in the absence of oxygen. Facultative anaerobes engineered as described above can be grown under substantially oxygen-free conditions, wherein the amount of oxygen present is not harmful to the growth, maintenance, and/or fermentation of the anaerobes, or can be alternatively grown in the presence of greater amounts of oxygen.

In some embodiments, the microbial host cells used in the methods described herein are filamentous fungal cells. (See, e.g., Berka & Barnett, Biotechnology Advances, (1989), 7 (2):127-154). Examples include *Trichoderma longibrachiatum, T. viride, T. koningii, T. harzianum, Penicillium* sp., *Humicola insolens, H. lanuginose, H. grisea, Chrysosporium* sp., *C. lucknowense, Gliocladium* sp., *Aspergillus* sp. (such as *A. oryzae, A. niger, A. sojae, A. japonicus, A. nidulans,* or *A. awamori*), *Fusarium* sp. (such as *F. roseum, F. graminum F. cerealis, F. oxysporuim,* or *F. venenatum*), *Neurospora* sp. (such as *N. crassa* or *Hypocrea* sp.), *Mucor* sp. (such as *M. miehei*), *Rhizopus* sp., and *Emericella* sp. cells. In particular embodiments, the fungal cell engineered as described above is *A. nidulans, A. awamori, A. oryzae, A. aculeatus, A. niger, A. japonicus, T. reesei, T. viride, F. oxysporum,* or *F. solani*. Illustrative plasmids or plasmid components for use with such hosts include those described in U.S. Patent Pub. No. 2011/0045563.

Yeasts can also be used as the microbial host cell in the methods described herein. Examples include: *Saccharomyces* sp., *Yarrowia* sp., *Schizosaccharomyces* sp., *Pichia* sp., *Candida* sp, *Kluyveromyces* sp., and *Hansenula* sp. In some embodiments, the *Saccharomyces* sp. is *S. cerevisiae* (See, e.g., Romanos et al., Yeast, (1992), 8 (6):423-488). In some embodiments, the *Yarrowia* sp. is *Y. lipolytica*. In some embodiments, the *Kluyveromyces* sp. is *K. marxianus*. In some embodiments, the *Hansenula* sp. is *H. polymorpha*. Illustrative plasmids or plasmid components for use with such hosts include those described in U.S. Pat. No. 7,659, 097 and U.S. Patent Pub. No. 2011/0045563.

In some embodiments, the host cell can be an algal cell derived, e.g., from a green algae, red algae, a glaucophyte, a chlorarachniophyte, a euglenid, a chromista, or a dinoflagellate. (See, e.g., Saunders & Warmbrodt, "Gene Expression in Algae and Fungi, Including Yeast," (1993), National Agricultural Library, Beltsville, Md.). Illustrative plasmids or plasmid components for use in algal cells include those described in U.S. Patent Pub. No. 2011/0045563. In other embodiments, the host cell is a cyanobacterium, such as cyanobacterium classified into any of the following groups based on morphology: Chlorococcales, Pleurocapsales, Oscillatoriales, Nostocales, or Stigonematales (See, e.g., Lindberg et al., Metab. Eng., (2010) 12 (1):70-79). Illustrative plasmids or plasmid components for use in cyanobacterial cells include those described in U.S. Patent Pub. Nos. 2010/0297749 and 2009/0282545 and in Intl. Pat. Pub. No. WO 2011/034863.

Genetic Engineering Methods

Microbial cells can be engineered for using conventional techniques of molecular biology (including recombinant techniques), microbiology, cell biology, biochemistry, and immunology, which are within the skill of the art. Such techniques are explained fully in the literature, see e.g., "Molecular Cloning: A Laboratory Manual," fourth edition (Sambrook et al., 2012); "Oligonucleotide Synthesis" (M. J. Gait, ed., 1984); "Culture of Animal Cells: A Manual of Basic Technique and Specialized Applications" (R. I. Freshney, ed., 6th Edition, 2010); "Methods in Enzymology" (Academic Press, Inc.); "Current Protocols in Molecular Biology" (F. M. Ausubel et al., eds., 1987, and periodic updates); "PCR: The Polymerase Chain Reaction," (Mullis et al., eds., 1994); Singleton et al., Dictionary of Microbiology and Molecular Biology 2nd ed., J. Wiley & Sons (New York, N.Y. 1994).

Vectors are polynucleotide vehicles used to introduce genetic material into a cell. Vectors useful in the methods described herein can be linear or circular. Vectors can integrate into a target genome of a host cell or replicate independently in a host cell. For many applications, integrating vectors that produced stable transformants are preferred. Vectors can include, for example, an origin of replication, a multiple cloning site (MCS), and/or a selectable marker. An expression vector typically includes an expression cassette containing regulatory elements that facilitate expression of a polynucleotide sequence (often a coding sequence) in a particular host cell. Vectors include, but are not limited to, integrating vectors, prokaryotic plasmids, episomes, viral vectors, cosmids, and artificial chromosomes.

Illustrative regulatory elements that may be used in expression cassettes include promoters, enhancers, internal ribosomal entry sites (IRES), and other expression control elements (e.g. transcription termination signals, such as polyadenylation signals and poly-U sequences). Such regulatory elements are described, for example, in Goeddel, Gene Expression Technology: Methods In Enzymology 185, Academic Press, San Diego, Calif. (1990).

In some embodiments, vectors may be used to introduce systems that can carry out genome editing, such as CRISPR systems. See U.S. Patent Pub. No. 2014/0068797, published 6 Mar. 2014; see also Jinek M., et al., "A programmable dual-RNA-guided DNA endonuclease in adaptive bacterial immunity," Science 337:816-21, 2012). In Type II CRISPR-Cas9 systems, Cas9 is a site-directed endonuclease, namely an enzyme that is, or can be, directed to cleave a polynucleotide at a particular target sequence using two distinct endonuclease domains (HNH and RuvC/RNase H-like domains). Cas9 can be engineered to cleave DNA at any desired site because Cas9 is directed to its cleavage site by RNA. Cas9 is therefore also described as an "RNA-guided nuclease." More specifically, Cas9 becomes associated with one or more RNA molecules, which guide Cas9 to a specific polynucleotide target based on hybridization of at least a portion of the RNA molecule(s) to a specific sequence in the target polynucleotide. Ran, F. A., et al., ("In vivo genome editing using *Staphylococcus aureus* Cas9," Nature 520 (7546):186-91, 2015 Apr. 9], including all extended data) present the crRNA/tracrRNA sequences and secondary structures of eight Type II CRISPR-Cas9 systems. Cas9-like synthetic proteins are also known in the art (see U.S. Published Patent Application No. 2014-0315985, published 23 Oct. 2014).

Vectors or other polynucleotides can be introduced into microbial cells by any of a variety of standard methods, such as transformation, electroporation, nuclear microinjection, transduction, transfection (e.g., lipofection mediated or DEAE-Dextrin mediated transfection or transfection using a recombinant phage virus), incubation with calcium phosphate DNA precipitate, high velocity bombardment with DNA-coated microprojectiles, and protoplast fusion. Transformants can be selected by any method known in the art. Suitable methods for selecting transformants are described in U.S. Patent Pub. Nos. 2009/0203102, 2010/0048964, and 2010/0003716, and International Publication Nos. WO 2009/076676, WO 2010/003007, and WO 2009/132220.

Engineered Microbial Cells

The above-described methods can be used to produce engineered microbial cells that produce, and in certain embodiments, overproduce, a molecule of interest. Engineered microbial cells can have at least 1, 2, 3, 4, 5, 6, 7, 8, 9, 10, or more genetic alterations, as compared to a wild-type microbial cell, such as any of the microbial host cells described herein. Engineered microbial cells described in the Examples below have two genetic alterations, but those of skill in the art can, following the guidance set forth herein, design microbial cells with additional alterations. In some embodiments, the engineered microbial cells have not more than 15, 14, 13, 12, 11, 10, 9, 8, 7, 6, 5, or 4 genetic alterations, as compared to a wild-type microbial cell. In various embodiments, engineered microbial cells can have a number of genetic alterations falling within the any of the following illustrative ranges: 1-10, 1-9, 1-8, 2-7, 2-6, 2-5, 2-4, 2-3, 3-7, 3-6, 3-5, 3-4, etc.

The engineered microbial cells can contain introduced genes that have a wild-type nucleotide sequence or that differ from wild-type. For example, the wild-type nucleotide sequence can be codon-optimized for expression in a particular host cell. The amino acid sequences encoded by any of these introduced genes can be wild-type or can differ from wild-type. In various embodiments, the amino acid sequences have at least 0 percent, 75 percent, 80 percent, 85 percent, 90 percent, 95 percent or 100 percent amino acid sequence identity with a wild-type amino acid sequence.

In various embodiments, the engineered microbial cells are capable of producing the molecule of interest at titers of at least 4, 5, 6, 7, 8, 9, 10, 20, 30, 40, 50, 75, 100, 200, 300, 400, 500, 600, 700, 800, or 900 mg/L or at least 1, 1.5, 2, 2.5, 3, 3.5, 4, 4.5, or 5 gm/L. In various embodiments, the titer is in the range of 4 mg/L to 5 gm/L, 10 mg/L to 4 gm/L, 100 mg/L to 3 gm/L, 200 mg/L to 2 gm/L, or any range bounded by any of the values listed above.

Culturing of Engineered Microbial Cells

Any of the engineered microbial cells described herein can be cultured, e.g., for maintenance, growth, and/or production of the molecule of interest.

In some embodiments, the cultures are grown to an optical density at 600 nm of 10-500.

In various embodiments, the cultures produce the molecule of interest at titers of at least 50, 75, 100, 200, 300, 400, 500, 600, 700, 800, or 900 mg/L or at least 1, 1.5, 2, 2.5, 3, 3.5, 4, 4.5, or 5 gm/L. In various embodiments, the titer is in the range of 100 mg/L to 5 gm/L, 200 mg/L to 4 gm/L, 300 mg/L to 3 gm/L, or any range bounded by any of the values listed above.

Culture Media

Microbial cells can be cultured in a minimal medium, i.e., one containing the minimum nutrients possible for cell growth. Minimal medium typically contains: (1) a carbon source for microbial growth; (2) salts, which may depend on the particular microbial cell and growing conditions; and (3) water.

Any suitable carbon source can be used to cultivate the host cells. The term "carbon source" refers to one or more carbon-containing compounds capable of being metabolized by a microbial cell. In various embodiments, the carbon source is a carbohydrate (such as a monosaccharide, a disaccharide, an oligosaccharide, or a polysaccharide), or an invert sugar (e.g., enzymatically treated sucrose syrup). Illustrative monosaccharides include glucose (dextrose), fructose (levulose), and galactose; illustrative oligosaccharides include lactose and sucrose, and illustrative polysaccharides include starch and cellulose. Suitable sugars include $C_6$ sugars (e.g., fructose, mannose, galactose, or glucose) and $C_5$ sugars (e.g., xylose or arabinose). Other, less expensive carbon sources include sugar cane juice, beet juice, sorghum juice, and the like, any of which may, but need not be, fully or partially deionized.

The salts in a culture medium generally provide essential elements, such as magnesium, nitrogen, phosphorus, and sulfur to allow the cells to synthesize proteins and nucleic acids.

Minimal medium can be supplemented with one or more selective agents, such as antibiotics.

To produce the molecule of interest, the culture medium can include, and/or be supplemented during culture with, glucose and/or a nitrogen source such as urea, an ammonium salt, ammonia, or any combination thereof.

Culture Conditions

Materials and methods suitable for the maintenance and growth of microbial cells are well known in the art. See, for example, U.S. Pub. Nos. 2009/0203102, 2010/0003716, and 2010/0048964, and International Pub. Nos. WO 2004/033646, WO 2009/076676, WO 2009/132220, and WO 2010/003007, Manual of Methods for General Bacteriology Gerhardt et al., eds), American Society for Microbiology, Washington, D.C. (1994) or Brock in Biotechnology: A Textbook of Industrial Microbiology, Second Edition (1989) Sinauer Associates, Inc., Sunderland, Mass.

In general, cells are grown and maintained at an appropriate temperature, gas mixture, and pH (such as about 20° C. to about 37° C., about 6% to about 84% $CO_2$, and a pH between about 5 to about 9). In some embodiments, cells are grown at 35° C. In some embodiments, the pH ranges for fermentation are between about pH 5.0 to about pH 9.0 (such as about pH 6.0 to about pH 8.0 or about 6.5 to about 7.0). Cells can be grown under aerobic, anoxic, or anaerobic conditions based on the requirements of the particular cell.

Standard culture conditions and modes of fermentation, such as batch, fed-batch, or continuous fermentation that can be used are described in U.S. Publ. Nos. 2009/0203102, 2010/0003716, and 2010/0048964, and International Pub. Nos. WO 2009/076676, WO 2009/132220, and WO 2010/003007. Batch and Fed-Batch fermentations are common and well known in the art, and examples can be found in Brock, Biotechnology: A Textbook of Industrial Microbiology, Second Edition (1989) Sinauer Associates, Inc.

In some embodiments, the cells are cultured under limited sugar (e.g., glucose) conditions. In various embodiments, the amount of sugar that is added is less than or about 105% (such as about 100%, 90%, 80%, 70%, 60%, 50%, 40%, 30%, 20%, or 10%) of the amount of sugar that is consumed by the cells. In particular embodiments, the amount of sugar that is added to the culture medium is approximately the same as the amount of sugar that is consumed by the cells during a specific period of time. In some embodiments, the rate of cell growth is controlled by limiting the amount of added sugar such that the cells grow at the rate that can be supported by the amount of sugar in the cell medium. In some embodiments, sugar does not accumulate during the time the cells are cultured. In various embodiments, the cells are cultured under limited sugar conditions for greater than or about 1, 2, 3, 5, 10, 15, 20, 25, 30, 35, 40, 50, 60, or 70 hours. In various embodiments, the cells are cultured under limited sugar conditions for greater than or about 5, 10, 15, 20, 25, 30, 35, 40, 50, 60, 70, 80, 90, 95, or 100% of the total length of time the cells are cultured. While not intending to be bound by any particular theory, it is believed that limited sugar conditions can allow more favorable regulation of the cells.

In some embodiments, the cells are grown in batch culture. The cells can also be grown in fed-batch culture or in continuous culture. Additionally, the cells can be cultured in minimal medium, including, but not limited to, any of the minimal media described above. The minimal medium can be further supplemented with 1.0% (w/v) glucose (or any other six-carbon sugar) or less. Specifically, the minimal medium can be supplemented with 1% (w/v), 0.9% (w/v), 0.8% (w/v), 0.7% (w/v), 0.6% (w/v), 0.5% (w/v), 0.4% (w/v), 0.3% (w/v), 0.2% (w/v), or 0.1% (w/v) glucose. Additionally, the minimal medium can be supplemented 0.1% (w/v) or less yeast extract. Specifically, the minimal medium can be supplemented with 0.1% (w/v), 0.09% (w/v), 0.08% (w/v), 0.07% (w/v), 0.06% (w/v), 0.05% (w/v), 0.04% (w/v), 0.03% (w/v), 0.02% (w/v), or 0.01% (w/v) yeast extract. Alternatively, the minimal medium can be supplemented with 1% (w/v), 0.9% (w/v), 0.8% (w/v), 0.7% (w/v), 0.6% (w/v), 0.5% (w/v), 0.4% (w/v), 0.3% (w/v), 0.2% (w/v), or 0.1% (w/v) glucose and with 0.1% (w/v), 0.09% (w/v), 0.08% (w/v), 0.07% (w/v), 0.06% (w/v), 0.05% (w/v), 0.04% (w/v), 0.03% (w/v), 0.02% (w/v), or 0.01% (w/v) yeast extract.

Recovery of a Molecule Produced by Fermentation

The fermentation methods described herein may further include a step of recovering the molecule produced by an engineered microbial host. In some embodiments, the produced molecule contained in a so-called harvest stream is recovered/harvested from the production vessel. The harvest stream may include, for instance, cell-free or cell-containing aqueous solution coming from the production vessel, which contains the produced molecule. Cells still present in the harvest stream may be separated from the molecule by any operations known in the art, such as for instance filtration, centrifugation, decantation, membrane crossflow ultrafiltration or microfiltration, tangential flow ultrafiltration or microfiltration or dead end filtration. After this cell separation operation, the harvest stream is essentially free of cells.

Further steps of separation and/or purification of the produced molecule from other components contained in the harvest stream, i.e., so-called downstream processing steps may optionally be carried out. These steps may include any means known to a skilled person, such as, for instance, concentration, extraction, crystallization, precipitation, adsorption, ion exchange, chromatography, distillation, electrodialysis, bipolar membrane electrodialysis and/or reverse osmosis. Any of these procedures can be used alone or in combination to purify the produced molecule. Further purification steps can include one or more of, e.g., concentration, crystallization, precipitation, washing and drying, treatment with activated carbon, ion exchange and/or re-crystallization. The design of a suitable purification protocol may depend on the cells, the culture medium, the size of the culture, the production vessel, etc. and is within the level of skill in the art.

Engineering of Microbes to Produce
3-Amino-4-Hydroxybenzoic Acid

Many microbes established for use in formation do not naturally produce 3-amino-4-hydroxybenzoic acid. Microbes that produce native metabolites L-aspartate semialdehyde and glycerone phosphate, can be engineered to produce 3-amino-4-hydroxybenzoic acid from these metabolites by introducing and expressing genes for a 2-amino-4,5-dihydroxy-6-oxo-7-phosphooxy-hepanoate synthase and a 3-amino-4-hydroxybenzoate synthase. This combination of enzymes converts L-aspartate semialdehyde and glycerone phosphate 3-amino-4-hydroxybenzoic acid. In some embodiments, the resulting strains produce 3-amino-4-hydroxybenzoic acid from simple sugar and ammonium sources. Examples 2-5 illustrate the use of this approach to engineer *C. glutamicum*, *B. subtilis*, *S. cerevisiae*, and *Y. lipolytica*, respectively, to produce 3-amino-4-hydroxybenzoic acid.

MOF-Containing Articles of Manufacture

In some embodiments, MOFs described herein can be incorporated into an article of manufacture. For example, a MOF can be converted into a shaped body, which either is, or is incorporated into an article of manufacture. The production of shaped bodies comprising metal organic frameworks is described, for example, in WO-A 03/102000.

Standard methods of producing shaped bodies include extrusion and tableting. In the production of shaped bodies, the MOF can be admixed with further materials such as binders, lubricants or other additives which are added during production. In some embodiments, a further constituent, such an absorbents (e.g., activated carbon or the like) can be incorporated into the MOF.

The possible geometries of the shaped bodies are subject to essentially no restrictions. Examples of suitable shapes are, inter alia, pellets such as circular pellets, pills, spheres, granules, extrudates such as rods, honeycombs, grids or hollow bodies.

An illustrative method of forming a shaped body from a MOF by extrusion includes: (a) kneading/pan milling of the MOF either alone or together with at least one binder and/or at least one pasting agent and/or at least one template compound to give a mixture; (b) shaping of the resulting mixture by means of at least one suitable method such as extrusion; (c) optional washing and/or drying and/or calcination of the extrudate; and (d) optional finishing treatment.

An illustrative method of forming a shaped body from a MOF by tableting includes: (a) tableting the MOF together with at least one binder and/or another auxiliary; and (b) application of the MOF to at least one porous or nonporous substrate. The material obtained can then be processed further to produce a shaped body by the above-described method.

Kneading/pan milling and shaping can be carried out by any suitable method, as described, for example, in Ullmann's Enzyklopadie der Technischen Chemie 4, 4th edition, volume 2, p. 313 ff. (1972). Kneading/pan milling and/or shaping can, for example, be carried out by means of a piston press, roller press in the presence or absence of at least one binder material, compounding, pelletization, tableting, extrusion, coextrusion, foaming, spinning, coating, granulation, preferably spray granulation, spraying, spray drying or a combination of two or more of these methods.

Kneading and/or shaping can be carried out at elevated temperatures, for example in the range from room temperature to 300° C., and/or at superatmospheric pressure, for example in the range from atmospheric pressure to a few hundred bar, and/or in a protective gas atmosphere, for example in the presence of at least one noble gas, nitrogen, or a mixture of two or more thereof.

Kneading and/or shaping is, in some embodiments, carried out with addition of at least one binder which can in principle be any chemical compound provides a viscosity of the composition suitable for kneading and/or shaping. Accordingly, binders can, for the purposes of the present invention, be either viscosity-increasing or viscosity-reducing compounds.

Illustrative binders are, for example, aluminum oxide or binders including aluminum oxide, as described, for example, in WO 94/29408, silicon dioxide, as described, for example, in EP 0 592 050 A1; mixtures of silicon dioxide and aluminum oxide, as described, for example, in WO 94/13584; clay minerals as described, for example, in JP 03-037156 A, such as, montmorillonite, kaolin, bentonite, halloysite, dickite, nacrite and or anauxite; alkoxysilanes as described, for example, in EP 0 102 544 B1, e.g., tetraalkoxysilanes, such as tetramethoxysilane, tetraethoxysilane, tetrapropoxysilane, or tetrabutoxysilane, or, e.g, trialkoxysilanes, such as trimethoxysilane, triethoxysilane, tripropoxysilane, or tributoxysilane; alkoxytitanates, e.g., tetralkoxytitanates, such as tetramethoxytitanate, tetraethoxytitanate, tetrapropoxytitanate, or tetrabutoxytitanate, or, e.g, trialkoxytitanates, such as trimethoxytitanate, triethoxytitanate, tripropoxytitanate, or tributoxytitanate; alkoxyzirconates, e.g., tetraalkoxyzirconates, such as tetramethoxyzirconate, tetraethoxyzirconate, tetrapropoxyzirconate, or tetrabutoxyzirconate, or, e.g., trialkoxyzirconates, such as trimethoxyzirconate, triethoxyzirconate, or tripropoxyzirconate, tributoxyzirconate; silica sols, amphiphilic substances; graphite; or combinations of such binders.

Illustrative viscosity-increasing compounds, that can optionally be used with one or more of the above-described binders include, for example, an organic compound; a hydrophilic polymer such as cellulose or a cellulose derivative, e.g., methylcellulose; a polyacrylate; a polymethacrylate; a polyvinyl alcohol; polyvinyl pyrrolidone; polyisobutene; polytetrahydrofuran; a polyethylene oxide; or combinations of such viscosity-increasing compounds.

Illustrative pasting agents include, inter alia, water; at least one alcohol such, as a monoalcohol having from 1 to 4 carbon atoms, e.g., methanol, ethanol, n-propanol, isopropanol, 1-butanol, 2-butanol, 2-methyl-1-propanol or 2-methyl-2-propanol; a mixture of water and at least one of the alcohols described above; or a polyhydric alcohol, such as a glycol (e.g., a water-miscible polyhydric alcohol), either alone or in admixture with water and/or at least one of the monohydric alcohols described above.

Further additives that can be used for kneading and/or shaping are, inter alia, amines or amine derivatives, such as tetraalkylammonium compounds, or amino alcohols and/or carbonate-comprising compounds, e.g. calcium carbonate. Such further additives are described, for instance, in EP 0 389 041 A1, EP 0 200 260 A1 and WO 95/19222.

The order of addition of any additive, such as binder, viscosity-increasing compound, pasting agent, and/or template compound, in shaping and kneading is generally not critical.

In some embodiments, a shaped body obtained after kneading and/or shaping is subjected to at least one drying step, which is can carried out at a temperature in the range from 25° C. to 500° C., for example, in the range from 50° C. to 500° C., and, in particular embodiments, in the range from 100° C. to 350° C. Alternatively or additionally, drying can be carried out under reduced pressure, under a protective gas atmosphere, and/or by spray drying. In certain embodiments, at least one of the additives is at least partly removed from the shaped body during the drying process.

Shaped bodies including a MOF described herein can, in some embodiments have a lower specific surface area than the MOF starting material. For example, in various embodiments shaped bodies can have specific surface areas of at least 250 m$^2$/g, at least 300 m$^2$/g, at least 400 m$^2$/g, at least 500 m$^2$/g, at least 600 m$^2$/g, at least 700 m$^2$/g, or at least 800 m$^2$/g. In some embodiments, the specific surface area is less than 1000 m$^2$/g. In some embodiments, the specific surface area falls within a range bounded by any of these values (e.g., 250-800 m$^2$/g, 300-700 m$^2$/g, or 400-600 m$^2$/g).

Methods of Using MOFs

MOFs described herein are porous and therefore useful for the uptake of at least one substance, e.g., for the purposes of its storage, separation, controlled release, chemical reaction, or support. In some embodiments, the substance is a gas or a gas mixture. In various embodiments, the gas or gas mixture includes hydrogen, nitrogen, carbon monoxide, carbon dioxide, oxygen, chlorine, ammonia, cyanogen chloride, hydrogen sulfide, hydrogen cyanide, sulfur dioxide, or combinations thereof.

Processes for storage by MOFs in general are described in WO-A 2005/003622, WO-A 2003/064030, WO-A 2005/049484, WO-A 2006/089908 and DE-A 10 2005 012 087.

Processes for separation or purification by MOFs in general are described in EP-A 1 674 555, DE-A 10 2005 000938 and in the German patent application number DE-A 10 2005 022 844. For example, carbon dioxide can be separated from a gas that includes carbon monoxide. Ethylene can be separated from ethane (more generally, olefins can be separated from paraffins). Dimethyl ether can be separated from chlormethane.

In some embodiments, carbon dioxide is separated off from a gas mixture, which may also include hydrogen, methane, carbon monoxide, and/or nitrogen. Flue gas is an example of such a mixture. Flue gas typically contains about 15 percent carbon dioxide, with the balance being nitrogen and water.

In certain embodiments, pressure swing adsorption can use a plurality of parallel adsorber reactors, with the adsorbent bed being made up completely or partly of a MOF, as described herein. The adsorption phase for the $CO_2/CO$ separation can be carried out at a $CO_2$ partial pressure of from 0.6 to 3 bar and a temperature of at least 20° C., but not more than 70° C. To desorb the adsorbed carbon dioxide, the total pressure in the adsorber reactor concerned is usually reduced to values in the range from 100 mbar to 1 bar.

If the MOFs described herein are used for storage, this is preferably carried out in a temperature range from −200° C. to +80° C., e.g., from −40° C. to +80° C. Pressures suitable for storage can range from 100 mbar to 100 bar (absolute), e.g., from 1 bar to 10 bar.

In other embodiments, MOFs, such as those described herein, are used for uptake of a liquid or liquid mixture. Examples of such a liquid or liquid mixture include disinfectants, inorganic or organic solvents, fuels (in particular gasoline or diesel), hydraulic fluid, radiator fluid, brake fluid or an oil (in particular machine oil). The liquid can also be halogenated aliphatic or aromatic, cyclic or acyclic hydrocarbons or mixtures thereof. In particular, the liquid can be acetone, acetonitrile, aniline, anisol, benzene, benzonitrile, bromobenzene, butanol, tert-butanol, quinoline, chlorobenzene, chloroform, cyclohexane, diethylene glycol, diethyl ether, dimethylacetamide, dimethylformamide, dimethyl sulfoxide, dioxane, glacial acetic acid, acetic anhydride, ethyl acetate, ethanol, ethylene carbonate, ethylene dichloride, ethylene glycol, ethylene glycol dimethyl ether, formamide, hexane, isopropanol, methanol, methoxypropanol, 3-methyl-1-butanol, methylene chloride, methyl ethyl ketone, N-methylformamide, N-methylpyrrolidone, nitrobenzene, nitromethane, piperidine, propanol, propylene carbonate, pyridine, carbon disulfide, sulfolane, tetrachloroethene, carbon tetrachloride, tetrahydrofuran, toluene, 1,1,1-trichloroethane, trichloroethylene, triethylamine, triethylene glycol, triglyme, water. or mixtures thereof.

In some embodiments, MOFs, such as those described herein, are used for uptake of an odorous substance. In various embodiments, the odorous substance is a volatile organic or inorganic compound that includes at least one of the elements nitrogen, phosphorus, oxygen, sulfur, fluorine, chlorine, bromine or iodine or is an unsaturated or aromatic hydrocarbon or a saturated or unsaturated aldehyde or a ketone. For example, the odorous substance can be ammonia, hydrogen sulfide, a sulfur oxide, a nitrogen oxide, ozone, a cyclic or acyclic hydrocarbon including nitrogen or sulfur, a cyclic or acyclic amine, a thiol, a thioether or aldehyde, saturated or unsaturated aldehydes (such as hexanal, heptanal, octanal, nonanal, decanal, octenal or nonenal), including volatile aldehydes (such as butyraldehyde, propionaldehyde, acetaldehyde and formaldehyde), a ketone, an ester, an ether, an acid (e.g., organic acids, such as acetic acid, propionic acid, butyric acid, isobutyric acid, valeric acid, isovaleric acid, caproic acid, heptanoic acid, lauric acid, or pelargonic acid), an alcohol. In certain embodiments, the odorous substance is a fuel, such as gasoline or diesel.

In some embodiments, the odorous substances is a fragrance, which is used, for example, for producing perfumes. Examples of fragrances or oils that can release such fragrances are: essential oils, basil oil, geranium oil, mint oil, cananga oil, cardamom oil, lavender oil, peppermint oil, nutmeg oil, camomile oil, eucalyptus oil, rosemary oil, lemon oil, lime oil, orange oil, bergamot oil, muscatel sage oil, coriander oil, cypress oil, 1,1-dimethoxy-2-phenylethane, 2,4-dimethyl-4-phenyltetrahydrofuran, dimethyltetrahydrobenzaldehyde, 2,6-dimethyl-7-octen-2-ol, 1,2-diethoxy-3,7-dimethyl-2,6-octadiene, phenylacetaldehyde, rose oxide, ethyl 2-methylpentanoate, 1-(2,6,6-trimethyl-1,3-cyclohexadien-1-yl)-2-buten-1-one, ethyl vanillin, 2,6-dimethyl-2-octenol, 3,7-dimethyl-2-octenol, tert-butylcyclohexyl acetate, anisyl acetate, allyl cyclohexyloxyacetate, ethyllinalool, eugenol, coumarin, ethyl acetoacetate, 4-phenyl-2,4,6-trimethyl-1,3-dioxane, 4-methylene-3,5,6,6-tetramethyl-2-heptanone, ethyl tetrahydrosafranate, geranyl nitrile, cis-3-hexen-1-ol, cis-3-hexenyl acetate, cis-3-hexenyl methyl carbonate, 2,6-dimethyl-5-hepten-1-al, 4-(tricyclo[5.2.1.0]decylidene)-8-butanal, 5-(2,2,3-trimethyl-3-cyclopentenyl)-3-methylpentan-2-ol, p-tert-butyl-alpha-methylhydrocinnamaldehyde, ethyl[5.2.1.0]tricyclodecanecarboxylate, geraniol, citronellol, citral, linalool, linalyl acetate, ionone, phenylethanol, and mixtures thereof.

In certain embodiments, the odorous substance has a boiling point or boiling point range below 300° C. In various embodiments, the odorous substance has a boiling point or boiling range below 250° C., below 230° C., or below 200° C.

In some embodiments, the odorous substance has a high volatility, e.g., a vapor pressure of more than 0.001 kPa (at 20° C.). In various embodiments, the odorous substance has a vapor pressure of: more than 0.01 kPa (at 20° C.), more than 0.05 kPa (at 20° C.), or more than 0.1 kPa (at 20° C.).

In some embodiments, MOFs, such as those described herein, are used in carrying out reactions. Examples in which a chemical reaction can take place in the presence of a MOF are the alkoxylation of monools and/or polyols. Methods of carrying out such alkoxylations are described in WO-A 03/035717 and WO-A 2005/03069. MOFs can likewise be used for epoxidation and for preparing polyalkylene carbonates and hydrogen peroxide. Such reactions are described in WO-A 03/101975, WO-A 2004/037895 and US-A 2004/081611. MOFs, such as those described herein, can be used in catalytic reactions, e.g., in which the MOF is used as a support for the catalyst.

In further embodiments, MOFs, as described herein, are used for catalytic detoxification of toxins, such as pesticides, insecticides, parasiticides, nematocides, neurotoxins, and nerve agents. Examples of this use of MOFs are described in CN-A 106905537 and US-A 2016/0175827. MOFs, such as those described herein, can be used for the catalytic detoxification of such toxins and find application as filter material or treatment material of garments, fabrics, consumer products, contaminated food, contaminated liquids or gases, such as contaminated air.

Example 1A

Production of a MOF From Zinc Nitrate Hexahydrate and 3-Amino-4-Hydroxybenzoic Acid (ZYM-800)

3-Amino-4-hydroxybenzoic acid (75.5 mg, 0.490 mmol) was dissolved in diethylformamide (10 mL) in a 50 mL jar. Zinc nitrate hexahydrate (146.6 mg, 0.493 mmol) was added and mixed until it was all dissolved. Methanol (10 mL) was then added. The jar was capped and placed in an oven at 100° C. and left over night. The reaction was taken out of the oven and allowed to cool to room temperature. The solution was decanted and replaced with clean methanol (3×) over the course of a day. Activation is done by heating at 225° C. under vacuum for 20 hours. The crystal structure of the MOF produced ("Zym-800") is illustrated in FIG. 1

Figure 2:
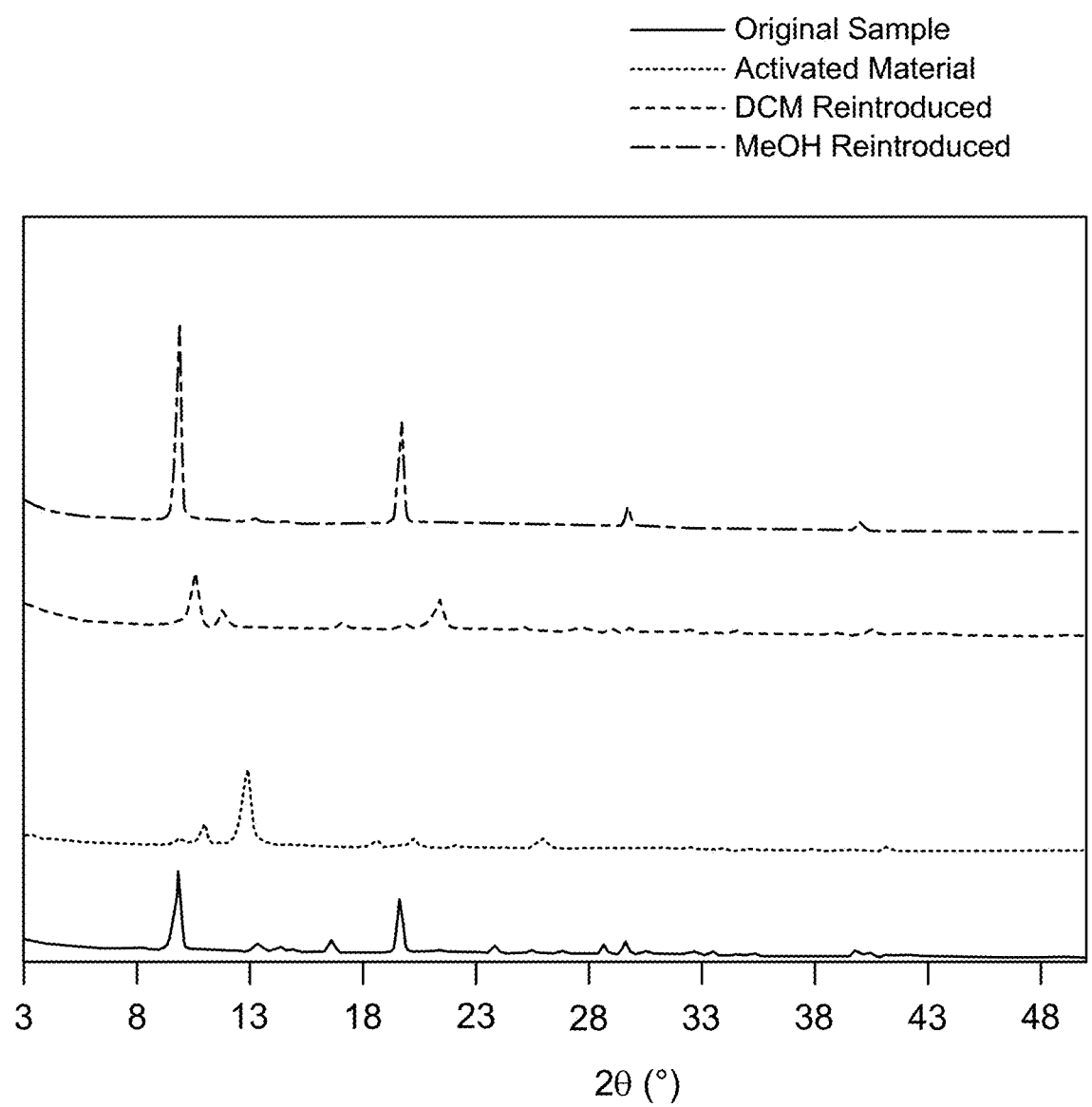
FIG. 2: Powder X-ray diffractogram for the MOF from zinc nitrate hexahydrate and 3-amino-4-hydroxybenzoic acid, as described in Example 1. Traces (in order, from bottom to top): "Original Sample"=MOF resulting from reaction mixture; "Activated Material"=MOF after washing with methanol and activation by heating under vacuum; "DCM Reintroduced"=post-activation MOF in which methanol has been reintroduced, followed by exchange of methanol with methylene chloride ("DCM"); and "MeOH Reintroduced"=post-activation MOF in which methanol ("MeOH") has been reintroduced.

Referring to FIG. 2, nitrogen gas adsorption data suggests that in the absence of the methanol wash, the pores of the MOF may collapse. Washing with methanol and applying heat under vacuum to activate the MOF, followed by reintroduction of methanol reopens the pores. Exchange of methanol with methylene chloride (DCM) causes a change in crystal structure, suggesting a change in pore size and collapsibility.

Figure 3:
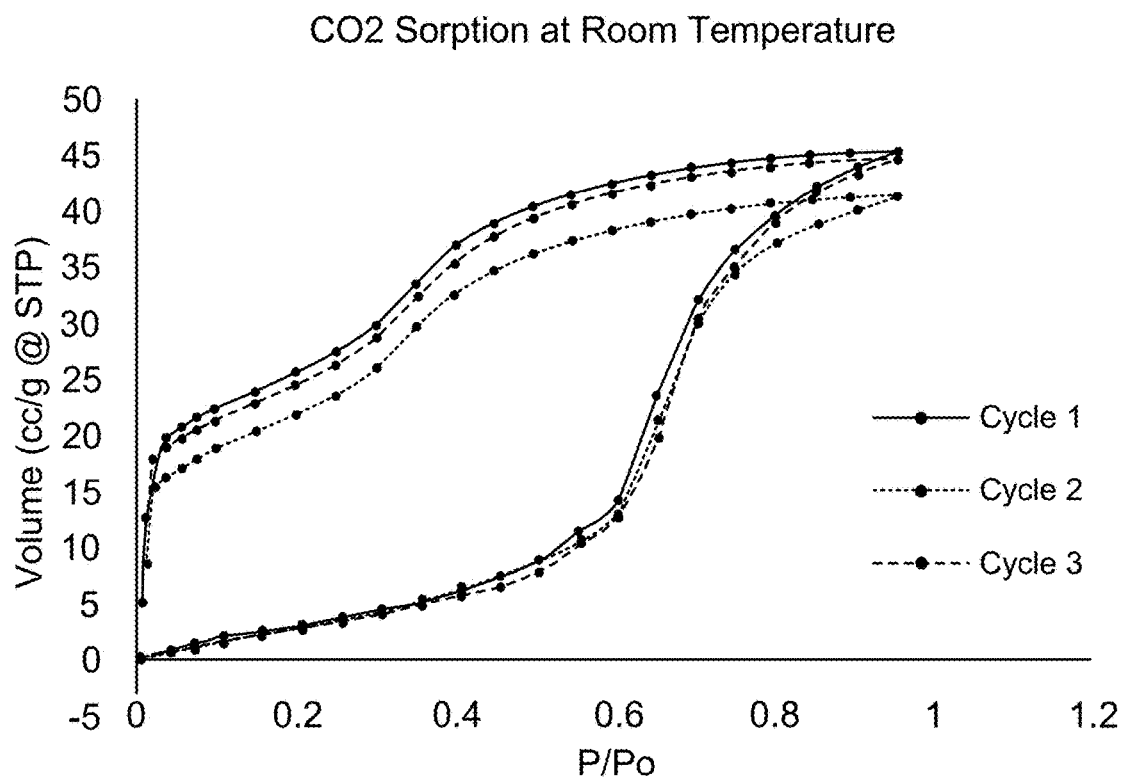
FIG. 3: Absorption and release upon heating of CO2 by the MOF from zinc nitrate hexahydrate and 3-amino-4-hydroxybenzoic acid, as described in Example 1. The Y axis is $CO_2$ uptake, and the X axis is pressure expressed as a fraction of 1 atmosphere. Different colored traces show adsorption and release curves for multiple cycles of adsorption and release, demonstrating that this MOF is recyclable.

FIG. 3 shows that the MOF demonstrates 11 weight percent $CO_2$ sorption at room temperature and can be regenerated upon heating. Therefore, this MOF is recyclable, indicating it can be used for repeated separation and storage procedures.

Example 1B

Production of a MOF From Cobalt Nitrate Hexahydrate and 3-Amino-4-Hydroxybenzoic Acid (ZYM-800(Co))

$Co(NO_3)_2.6H_2O$ (145 mg, 0.498 mmol) and 3-amino-4-hydroxybenzoic acid (76.6 mg, 0.500 mmol) were dissolved in a mixture of 10 mL of diethylformamide and 10 mL of methanol in a 50 mL glass jar. The resulting solution was briefly sonicated before incubated in a 100° C. oven for 1 day. Deep purple color crystalline powder was obtained by filtration and washed with methanol and dichloromethane. The obtained powder was evacuated at 225° C. under dynamic vacuum for 20 h prior to sorption analysis Example 1C Production of a MOF From Zinc Acetate Hexahydrate and 3-Amino-4-Hydroxybenzoic Acid Free of Diethylformamide (ZYM-800(Zn))

$Zn(OAc)_2.6H_2O$ (100 mg, 0.459 mmol) and 3-amino-4-hydroxybenzoic acid (69.1 mg, 0.451 mmol) were dissolved in a mixture of 15 mL methanol and 20 mL n-amy alcohol in an open round bottom flask. The resulting mixture was heated in an oil bath at 110° C. After the removal of volatile methanol, a grey color crystalline powder was obtained. The powder was isolated by filtration and washed with methanol. The sample was evacuated at 250° C. under dynamic vacuum for 10 h prior to sorption analysis Example 2

Engineering of *C. glutamicum* to Produce-Amino-4-Hydroxybenzoic Acid

Several strains of *C. glutamicum* are constructed, each expressing a 2-amino-4,5-dihydroxy-6-oxo-7-phosphooxy-hepanoate synthase and a 3-amino-4-hydroxybenzoate synthase. The combination of these two enzymes converts the native metabolites L-aspartate semialdehyde and glycerone phosphate to the product 3-amino-4-hydroxybenzoic acid. The strains are tested for their ability to produce 3-amino-4-hydroxybenzoic acid from simple sugar and ammonium sources in comparison to a reference strain lacking the enzymes.

Candidate genes (e.g. from *Streptomyces* sp. or *Saccharothrix espanaensis*) encoding 2-amino-4,5-dihydroxy-6-oxo-7-phosphooxy-hepanoate synthase and a 3-amino-4-hydroxybenzoate synthase are selected from databases like UniProt or BRENDA or from literature and ordered as synthetic genes from synthetic DNA vendors. The candidate genes are then PCR amplified and subsequently assembled into *Corynebacterium* cloning vectors together with appropriate promoters, terminators, and regions for genomic integration. The *Corynebacterium* cloning vectors contain selectable (e.g. kanamycin antibiotic resistance) and counter-selectable (e.g. levansucrase) genetic markers. Vectors are initially transformed into *E. coli* using standard heat shock transformation techniques in order to identify correctly assembled clones, and to amplify vector DNA for *Corynebacterium* transformation. Validated clones are transformed into *C. glutamicum* host cells via electroporation and (single cross-over) transformants are selected on growth medium with the appropriate selection agent (e.g. the antibiotic kanamycin). Cultures of *C. glutamicum* are subsequently cultivated in a growth medium with the appropriate counter-selection agent (e.g. sucrose) to select for removal of the vector backbone. To validate that the correct loop out event happened, colonies exhibiting the correct phenotype (e.g. sucrose resistance) are analyzed via colony PCR and/or sequencing.

Each newly created strain and its reference strain is tested for production of the 3-amino-4-hydroxybenzoic acid in small scale cultures (e.g., 96 well plates) designed to assess product titer performance. Product titer is measured using liquid chromatography coupled to mass spectrometry. A titer of 4.5 mg/ml (in 96 well plates) can be achieved.

Example 3

Engineering of *B. subtilis* to Produce-Amino-4-Hydroxybenzoic Acid

Several strains of *B. subtilis* are constructed, each expressing a 2-amino-4,5-dihydroxy-6-oxo-7-phosphooxy-hepanoate synthase and a 3-amino-4-hydroxybenzoate synthase. The combination of these two enzymes converts the native metabolites L-aspartate semialdehyde and glycerone phosphate to the product 3-amino-4-hydroxybenzoic acid. The strains are tested for their ability to produce 3-amino-4-hydroxybenzoic acid from simple sugar and ammonium sources in comparison to a reference strain lacking the enzymes.

Candidate genes (e.g. from *Streptomyces* sp. or *Saccharothrix espanaensis*) encoding 2-amino-4,5-dihydroxy-6-oxo-7-phosphooxy-hepanoate synthase and a 3-amino-4-hydroxybenzoate synthase are selected from databases like UniProt or BRENDA or from literature and ordered as synthetic genes from synthetic DNA vendors. The candidate genes are then PCR amplified and subsequently assembled into cloning vectors together with appropriate promoters, terminators, selectable marker (e.g. kanamycin antibiotic resistance), counter-selectable marker (e.g. phosphoribosyltransferase), and regions for genomic integration. Vectors are initially transformed into *E. coli* using standard heat shock transformation techniques in order to identify correctly assembled clones, and to amplify vector DNA for *Bacillus* transformation. Validated clones are transformed into *B. subtilis* host cells via natural competence and (double cross-over) transformants are selected on growth medium with the appropriate selection agent (e.g. the antibiotic kanamycin). To validate that the correct integration event happened, colonies exhibiting the correct phenotype (e.g. kanamycin resistance) are analyzed via colony PCR and/or sequencing.

Optionally: to remove the selection marker and counter-selection markers, cultures of *B. subtilis* are subsequently optionally cultivated in a growth medium with the appropriate counter-selection agent (e.g. 5-fluorouracil). To validate that the correct loop-out event happened, colonies exhibiting the correct phenotype (e.g. 5-fluorouracil resistance) are analyzed via colony PCR and/or sequencing.

Each newly created strain and its reference strain is tested for production of the 3-amino-4-hydroxybenzoic acid in small scale cultures (e.g., 96 well plates) designed to assess product titer performance.

Example 4

Engineering of *S. cerevisiae* to Produce-Amino-4-Hydroxybenzoic Acid

Several strains of *S. cerevisiae* are constructed, each expressing a 2-amino-4,5-dihydroxy-6-oxo-7-phosphooxy-hepanoate synthase and a 3-amino-4-hydroxybenzoate synthase. The combination of these two enzymes converts the native metabolites L-aspartate semialdehyde and glycerone phosphate to the product 3-amino-4-hydroxybenzoic acid. The strains are tested for their ability to produce 3-amino-4-hydroxybenzoic acid from simple sugar and ammonium sources in comparison to a reference strain lacking the enzymes.

Candidate genes (e.g. from *Streptomyces* sp. or *Saccharothrix espanaensis*) encoding 2-amino-4,5-dihydroxy-6-oxo-7-phosphooxy-hepanoate synthase and a 3-amino-4-hydroxybenzoate synthase are selected from databases like UniProt or BRENDA or from literature, and ordered as synthetic genes from synthetic DNA vendors. The candidate genes are then PCR amplified and subsequently assembled into cloning vectors together with appropriate promoters, terminators, selectable and counter-selectable marker (e.g. orotidine-5'-phosphate decarboxylase), and regions for genomic integration. Vectors are initially transformed into *E. coli* using standard heat shock transformation techniques in order to identify correctly assembled clones and to amplify vector DNA for *Bacillus* transformation. Validated clones are linearized and transformed into *S. cerevisiae* host cells lacking orotidine-5'-phosphate decarboxylase activity via chemical/heat shock transformation and (double cross-over) transformants are selected on growth medium with the appropriate selection conditions (e.g. absence of uracil). To validate that the correct integration event happened, colonies exhibiting the correct phenotype (e.g. growth in absence of uracil) are analyzed via colony PCR and/or sequencing.

Each newly created strain and its reference strain is tested for production of the 3-amino-4-hydroxybenzoic acid in small scale cultures (e.g., 96 well plates) designed to assess product titer performance. Product titer is measured using liquid chromatography coupled to mass spectrometry.

Example 5

Engineering of *Y. lipolytica* to Produce-Amino-4-Hydroxybenzoic Acid

Several strains of *Y. lipolytica* are constructed, each expressing a 2-amino-4,5-dihydroxy-6-oxo-7-phosphooxy-hepanoate synthase and a 3-amino-4-hydroxybenzoate synthase. The combination of these two enzymes converts the native metabolites L-aspartate semialdehyde and glycerone phosphate to the product 3-amino-4-hydroxybenzoic acid. The strains are tested for their ability to produce 3-amino-4-hydroxybenzoic acid from simple sugar and ammonium sources in comparison to a reference strain lacking the enzymes.

Candidate genes (e.g. from *Streptomyces* sp. or *Saccharothrix espanaensis*) encoding 2-amino-4,5-dihydroxy-6-oxo-7-phosphooxy-hepanoate synthase and a 3-amino-4-hydroxybenzoate synthase are selected from databases like UniProt or BRENDA or from literature and ordered as synthetic genes from synthetic DNA vendors. The candidate genes are then PCR amplified and subsequently assembled into cloning vectors together with appropriate promoters, terminators, selectable and counter-selectable marker (e.g. orotidine-5'-phosphate decarboxylase), and regions for genomic integration. Vectors are initially transformed into *E. coli* using standard heat shock transformation techniques in order to identify correctly assembled clones, and to amplify vector DNA for *Bacillus* transformation. Validated clones are linearized and transformed into *Y. lipolytica* host cells lacking orotidine-5'-phosphate decarboxylase activity via chemical/heat shock transformation and (double cross-over) transformants are selected on growth medium with the appropriate selection conditions (e.g. absence of uracil). To validate that the correct integration event happened, colonies exhibiting the correct phenotype (e.g. growth in absence of uracil) are analyzed via colony PCR and/or sequencing.

Each newly created strain and its reference strain is tested for production of the 3-amino-4-hydroxybenzoic acid in small scale cultures (e.g., 96 well plates) designed to assess product titer performance. Product titer is measured using liquid chromatography coupled to mass spectrometry.

Example 6

Detoxification of O-pinacolyl methyl phosphonofluoridate (Soman)

Figure 4:
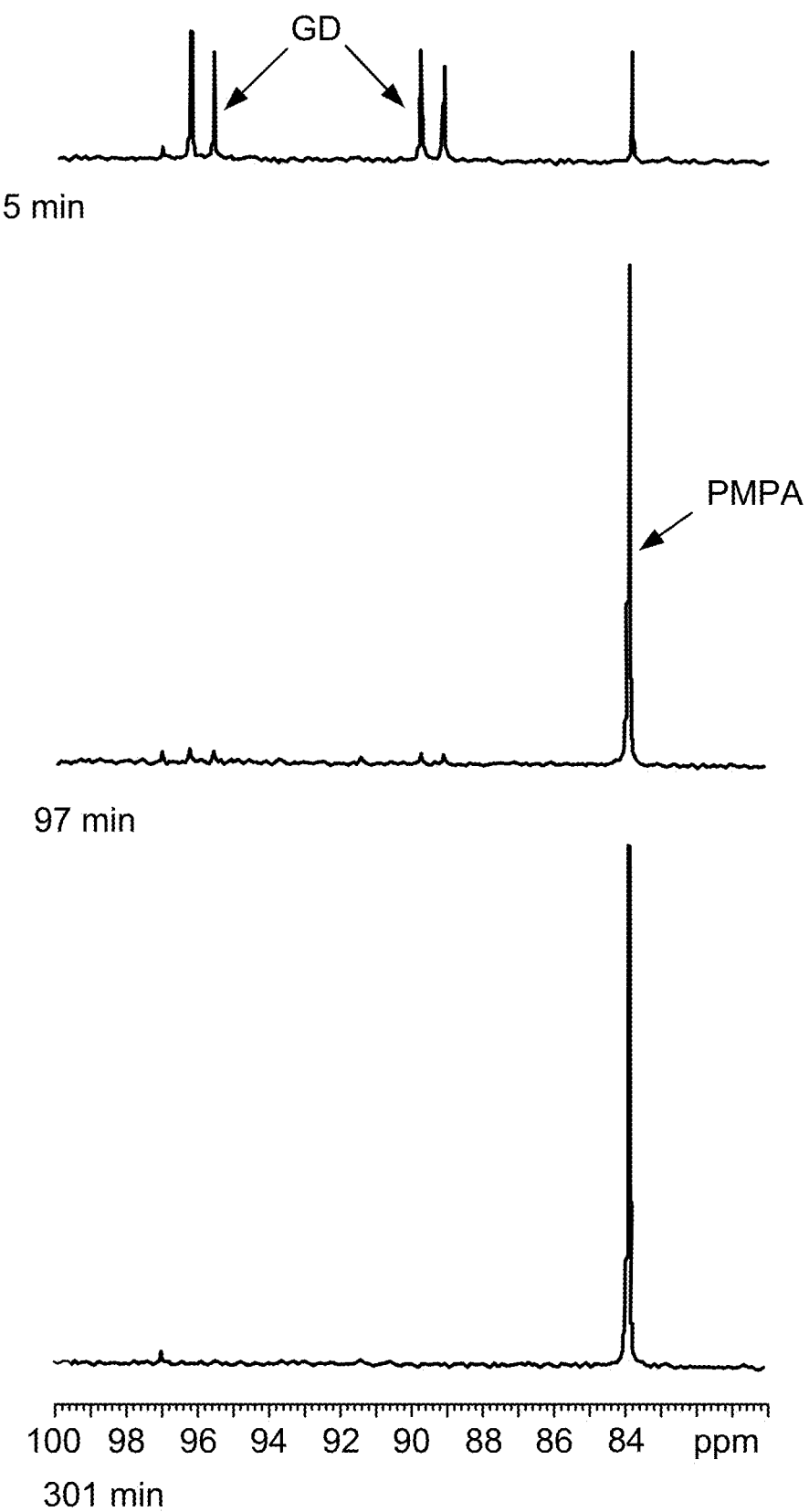
FIG. 4: NMR study on the conversion of O-pinacolyl methyl phosphonofluoridate to O-pinacolyl methyl phosphonate.

2.7 μL of Soman ("GD") were dissolved in 1 mL of water and 30 mg of Zym-800 were added to the solution. The conversion of Soman to O-pinacolyl methyl phopsphonate ("PMPA") was monitored by $^{31}$P-NMR spectroscopy. FIG. 4 discloses the recorded NMRs at 5 minutes, 97 minutes and 301 minutes. As can be seen the GD peaks are substantially reduced at 97 minutes and have substantially disappeared after 301 minutes. The half-life of the conversion was determined to be about 132 minutes.

What is claimed is:

1. An isolated metal-organic framework material (MOF) comprising:
    zinc (Zn); and
    at least one ligand comprising the structure $Ar(R_1HR')(R_2H)(R_3)$ or a partly deprotonated form thereof or a completely deprotonated form thereof, wherein:
        Ar comprises an aromatic ring or multi-ring structure;
        $R_1$ is an element bonded to Ar, hydrogen (H), and R';
        R' is selected from the group consisting of H, $CH_3$, and $C_2H_5$;
        $R_2$ is different from $R_1$ and is an element bonded to Ar and hydrogen (H);
        $R_1HR'$ and $R_2H$ are ortho to each other;
        $R_3$ is meta to $R_1$ and para to $R_2$; and
        $R_3$ is bonded to Ar and comprises a structure that coordinates with the zinc, wherein $R_3$ is selected from the group consisting of an $Ar(R_1HR')(R_2H)$ moiety, $C(=O)OH$, OH, SH, $NH_2$, NHR', and a heterocyclic ring.

2. The MOF of claim 1, wherein $R_1$ is selected from the group consisting of nitrogen (N), phosphorus (P), arsenic (As), antimony (Sb), and bismuth (Bi).

3. The MOF of claim 1, wherein $R_2$ is selected from the group consisting of oxygen (O), sulfur (S), selenium (Se), tellurium (Te), and polonium (Po).

4. The MOF of claim 3, wherein $R_2$ is O.

5. The MOF of claim 1, wherein $R_3$ is $C(=O)OH$.

6. The MOF of claim 1, wherein $R_1$ is N.

7. The MOF of claim 1, wherein R' is H.

8. The MOF of claim 1, wherein Ar is a non-benzene aromatic ring.

9. The MOF of claim 1, wherein the external volume of the MOF increases by more than 10% after adsorption of a substance by the MOF, as compared to the volume of the MOF after activation, but prior to adsorption.

10. An isolated metal-organic framework material (MOF) comprising:
    zinc; and
    at least one ligand, wherein the at least one ligand is 3-amino-4-hydroxybenzoic acid or a partly deprotonated form thereof or a completely deprotonated form thereof.

11. The MOF of claim 10, wherein the at least one ligand is coordinated with the zinc at a position on an aromatic ring of the ligand, and wherein the position on the aromatic ring is meta to the amino group on the 3-amino-4-hydroxybenzoic acid and para to the hydroxy group on the 3-amino-4-hydroxybenzoic acid.

* * * * *